(12) United States Patent
Dill

(10) Patent No.: US 8,944,467 B1
(45) Date of Patent: Feb. 3, 2015

(54) AUTOMATED RV LANDING GEAR

(71) Applicant: James E. Dill, Fort Smith, AR (US)

(72) Inventor: James E. Dill, Fort Smith, AR (US)

( * ) Notice: Subject to any disclaimer, the term of this patent is extended or adjusted under 35 U.S.C. 154(b) by 0 days.

(21) Appl. No.: 14/300,452

(22) Filed: Jun. 10, 2014

(51) Int. Cl.
  *B60S 9/02* (2006.01)
  *B60S 9/08* (2006.01)
(52) U.S. Cl.
  CPC .......................................... *B60S 9/08* (2013.01)
  USPC ....................................................... 280/766.1
(58) Field of Classification Search
  USPC ............ 280/763.1, 762, 766.1; 254/100, 103, 254/134, 419–425; 248/352, 354.5
  See application file for complete search history.

(56) References Cited

U.S. PATENT DOCUMENTS

| | | | |
|---|---|---|---|
| 4,863,184 A | 9/1989 | Mena | |
| 5,273,256 A | 12/1993 | Chambers | |
| 5,423,518 A * | 6/1995 | Baxter et al. | 254/419 |
| 6,099,016 A * | 8/2000 | Peveler | 280/475 |
| 6,623,035 B1 | 9/2003 | Schneider | |
| 7,377,362 B2 | 5/2008 | Blodgett, Jr. et al. | |

* cited by examiner

*Primary Examiner* — John Walters
*Assistant Examiner* — James Triggs
(74) *Attorney, Agent, or Firm* — Molly D. McKay

(57) ABSTRACT

An automated landing gear for an RV with a dual action mechanism that allows an automatic extension tube and attached ground engaging foot to fully extend and retract in telescoping fashion within and out the bottom of an open ended outer tube mounted to an RV. A reversible motor rotates a vertical jack screw which engages a threaded jack nut to extend and retract an open ended inner tube out the bottom of the outer tube. The jack screw extends through a bearing and has a drive nut on its lower end. The drive nut is slidably encased by a drive tube that rotates in conjunction with the jack screw. Male threads on a lower end of the drive tube engage female threads within the automatic extension tube causing the automatic extension tube to extend and retract.

9 Claims, 6 Drawing Sheets

AUTOMATED RV LANDING GEAR

BACKGROUND OF THE INVENTION

1. Field of the Invention

The present invention relates to a landing gear such as would be found on a recreational vehicle (RV). The landing gear is designed to be automated with a motor to drive the landing gear. Further the present landing gear is provided with a dual action mechanism that allows the operator to fully extend the foot without having to manually pull a pin, extend the leg and reinsert the pin in the landing gear mechanism to achieve the necessary extension.

2. Description of the Related Art

The landing gear currently employed on most RVs is motorized. However, even the most common type of motorized landing gear still requires the operator to manually pull a pin out of the leg which allows the leg to slide or telescope downward to lengthen it and then reinsert the pin through aligned holes provided in the leg and the supporting portion of the landing gear before the motorized landing gear can be used to lower to the ground a foot that is attached to the leg.

This manual procedure is required because the landing gear does not have sufficient motorized retraction and extension length to fully retract to a height necessary for the RV to be ready to travel and also fully extend when the RV is to be set up for stationary use.

Manually pulling a pin, telescope the leg downward or upward and then reinsert the pin to hold the leg in the new position is inconvenient at best. This manual operation is particularly inconvenient when the weather is cold or wet because the person who is performing this operation must get down on their knees, sometimes in the mud, to accomplish the task. Also, the owners of RVs are often older individuals who may have had knee or hip replacement surgery which makes getting down on their knees to perform this manual operation difficult or painful.

The present invention addresses this need by providing a motorized landing gear that is fully extendable and retractable by motor driven power and does not require manual extension or retraction of the leg.

SUMMARY OF THE INVENTION

The present invention is an automated landing gear for use on RVs, trailers or similar items. However, the invention is not limited to these uses. The automated landing gear is a dual action mechanism that allows the leg and attached foot to fully extend and fully retract without the need for manually extending or retracting the leg.

The invention employs a reversible motor that drives a vertical jack screw. The jack screw engages a female threaded jack nut which in turn extends or retracts an inner tube of the landing gear mechanism depending on the direction of rotation of the jack screw. An outer tube of the landing gear covers the jack screw and the jack nut, and the outer tube is open on its bottom end to allow an inner tube and an automatic extension tube to telescope within the outer tube and to telescope out the bottom end of the outer tube. The jack screw extends through a downwardly extending jack nut tube provided on the jack nut, then through a bearing retainer, a snap ring, a bearing, and a bearing holder before terminating on its lower end in a drive nut. The snap ring engages a circumferential groove provided externally in the downwardly extending jack nut tube provided on the jack nut to secure the bearing retainer to the jack nut. Bearing screws extend through screw openings provided in the bearing retainer and around the bearing and bearing holder to secure to threaded openings provided in the top of a drive tube.

The drive nut is encased within the drive tube so that the drive nut is free to move upward and downward within the drive tube, but so that the drive nut rotates the drive tube in conjunction with the turning of the jack screw. Thus, the drive tube moves up and down in conjunction with the drive nut, but the bearing also allows the drive tube to rotate in conjunction with the jack screw.

The lower end of the drive tube is provided with male threads that engage female threads provided internally within an automatic extension tube so that the male threads on the lower end of the drive tube cause the automatic extension tube to move upward or downward depending on the direction of rotation of the drive tube. The lower end of the automatic extension tube is provided with a bracket with an opening to which a foot for engaging the ground attaches by means of a pin.

DETAILED DESCRIPTION OF THE PREFERRED EMBODIMENT

Figure 1:
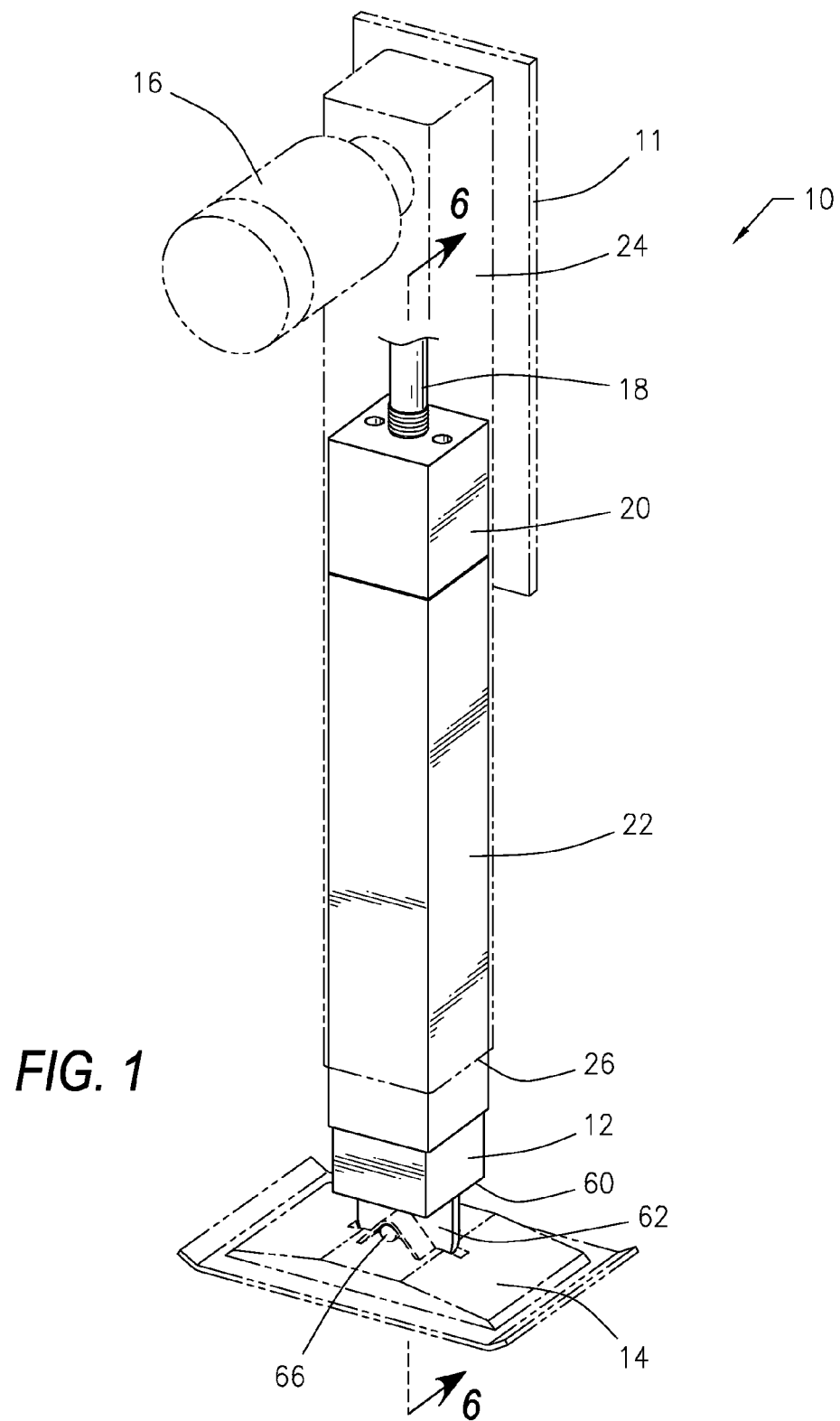
FIG. 1 is a perspective view of a landing gear for use on an RV or similar item that is constructed in accordance with a preferred embodiment of the present invention shown with the landing gear in a fully retracted position. For purposes of illustration, the motor, the outer tube, the mounting bracket and the foot of the landing gear are shown in outline.
Figure 2:
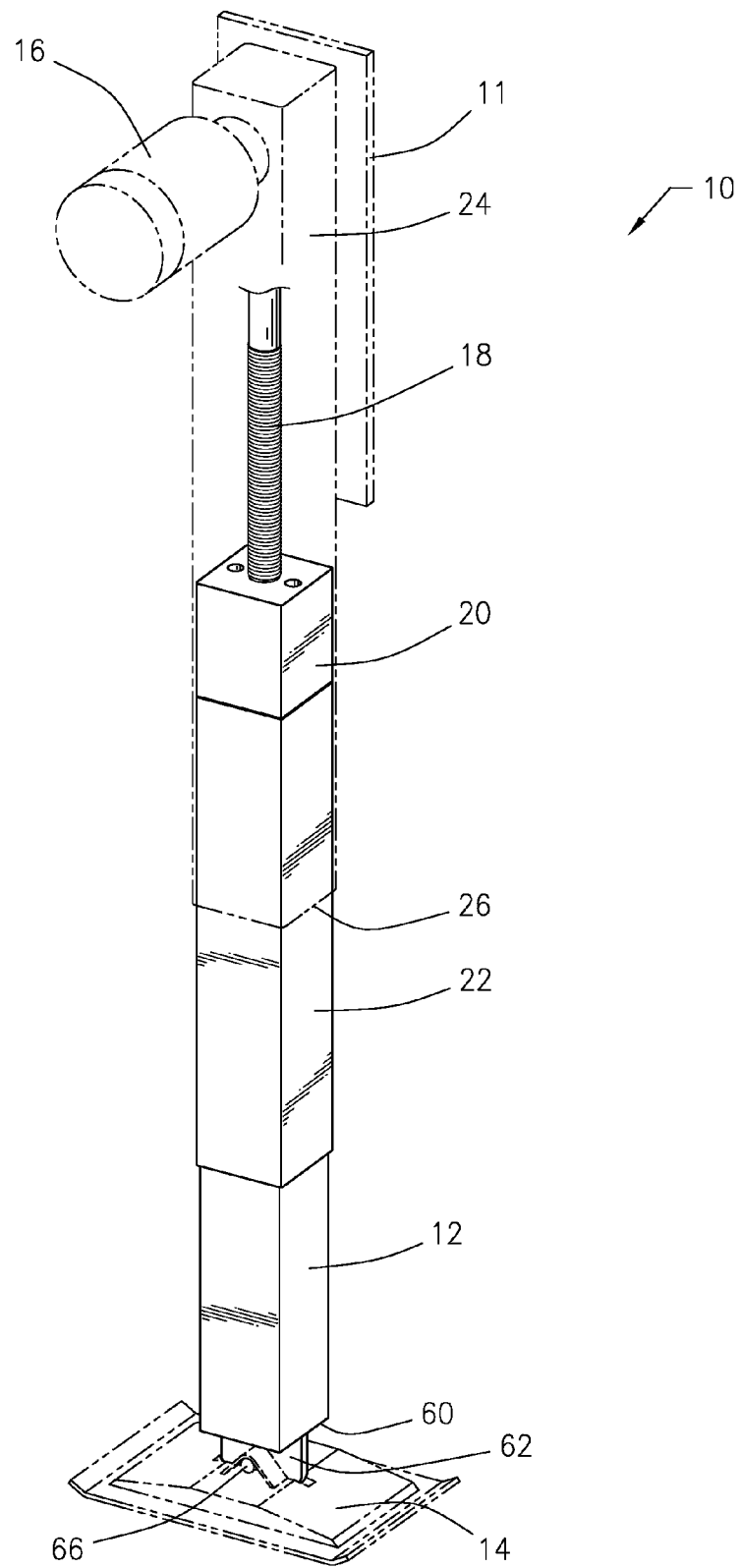
FIG. 2 is the landing gear of FIG. 1 shown in a fully extended position. For purposes of illustration, the motor, the outer tube, the mounting bracket and the foot of the landing gear are shown in outline.
Figure 4:
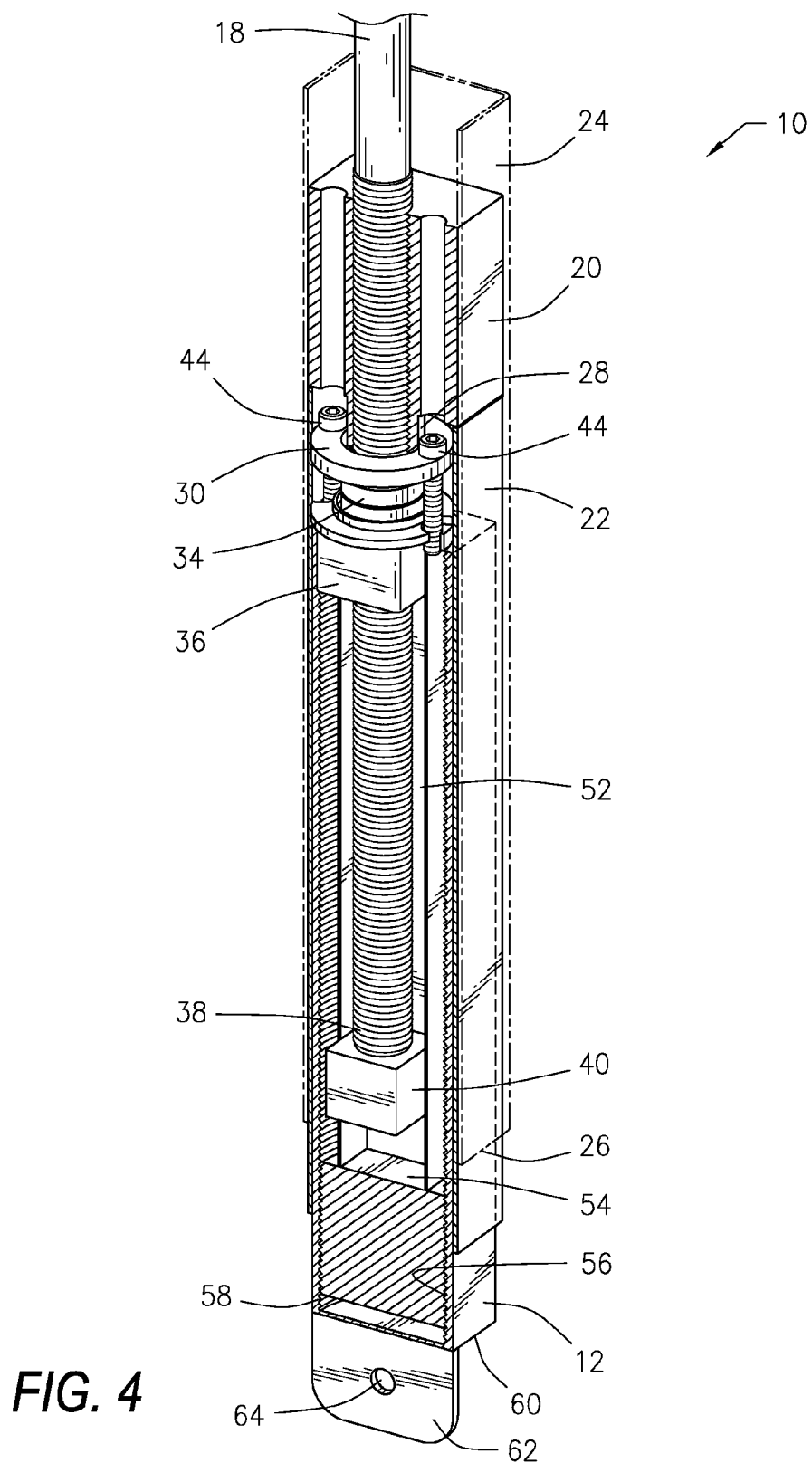
FIG. 4 is a partially cut away view of the landing gear of FIG. 1 shown with the foot removed.
Figure 5:
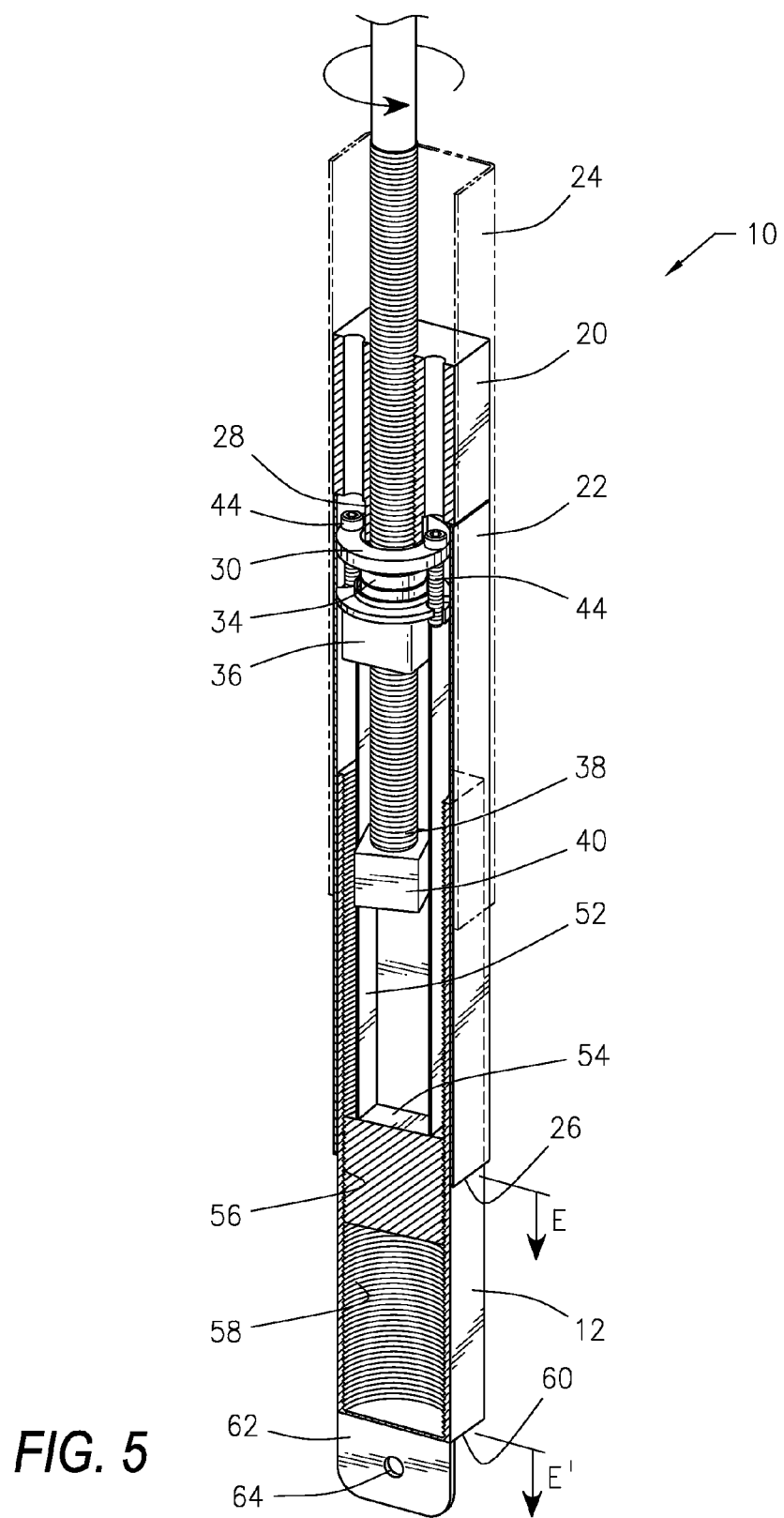
FIG. 5 is a partially cut away view of the landing gear of FIG. 2 shown with the foot removed for clarity.

Referring now to the drawings and initially to FIGS. 1 and 2, there is illustrated an automated landing gear 10 that is constructed in accordance with a preferred embodiment of the present invention for use on RVs, trailers or similar items or equipment. Shown in outline is a mounting bracket 11 that mounts the automated landing gear 10 to the RV, trailer or other similar item on which it is to be employed. However, it should be understood that the invention is not limited to these uses and may be used for any application for which it is suitable. The automated landing gear 10 is a dual action mechanism that allows an automatic extension tube 12 that serves as the supporting leg and an attached foot 14 to fully extend, as illustrated in FIGS. 2 and 5, and to fully retract, as illustrated in FIGS. 1 and 4, without the need for manual extending or retracting.

Figure 3:
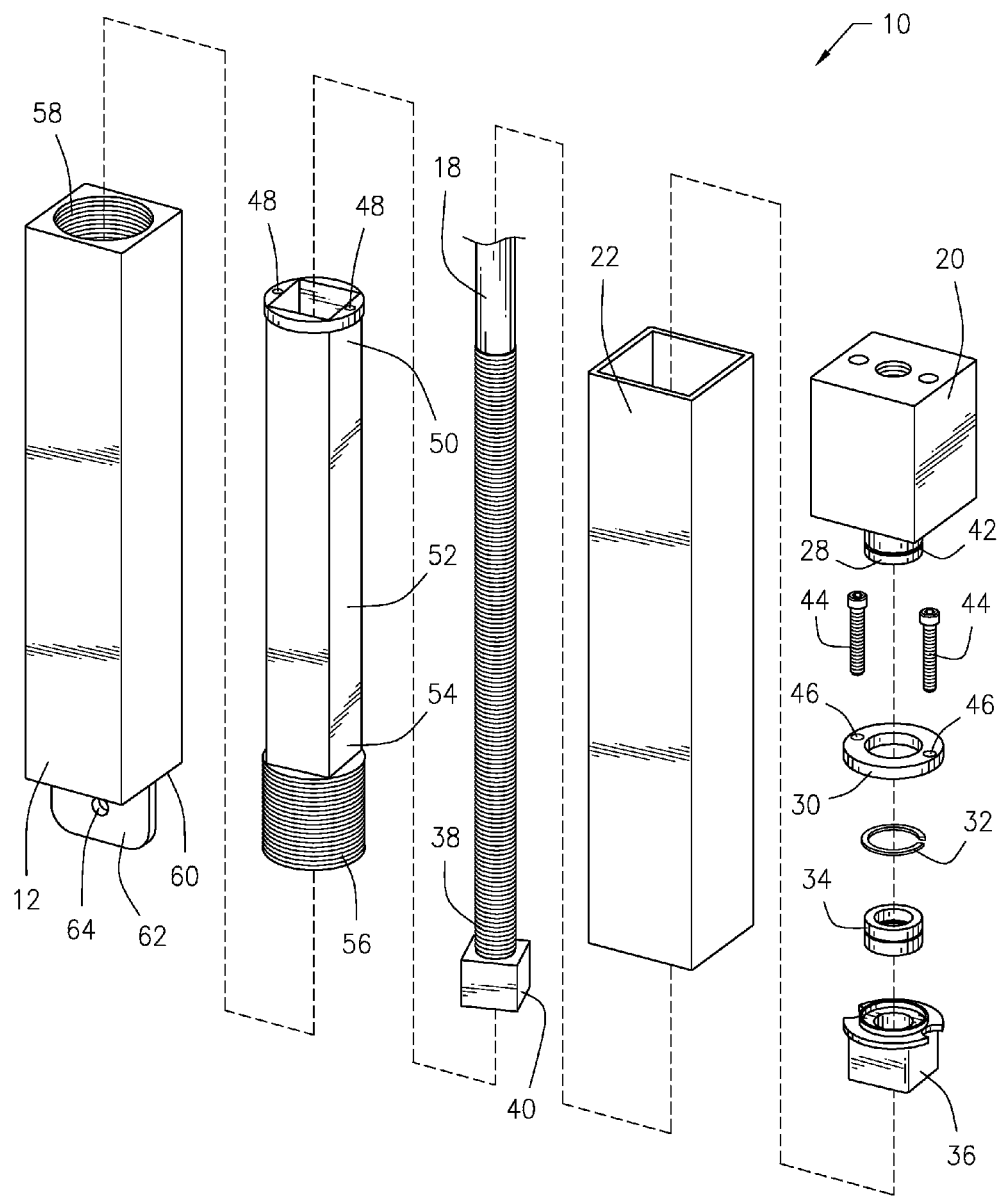
FIG. 3 is an exploded view of the landing gear of FIGS. 1 and 2 shown with the motor, the outer tube, the mounting bracket and the foot removed.
Figure 6:
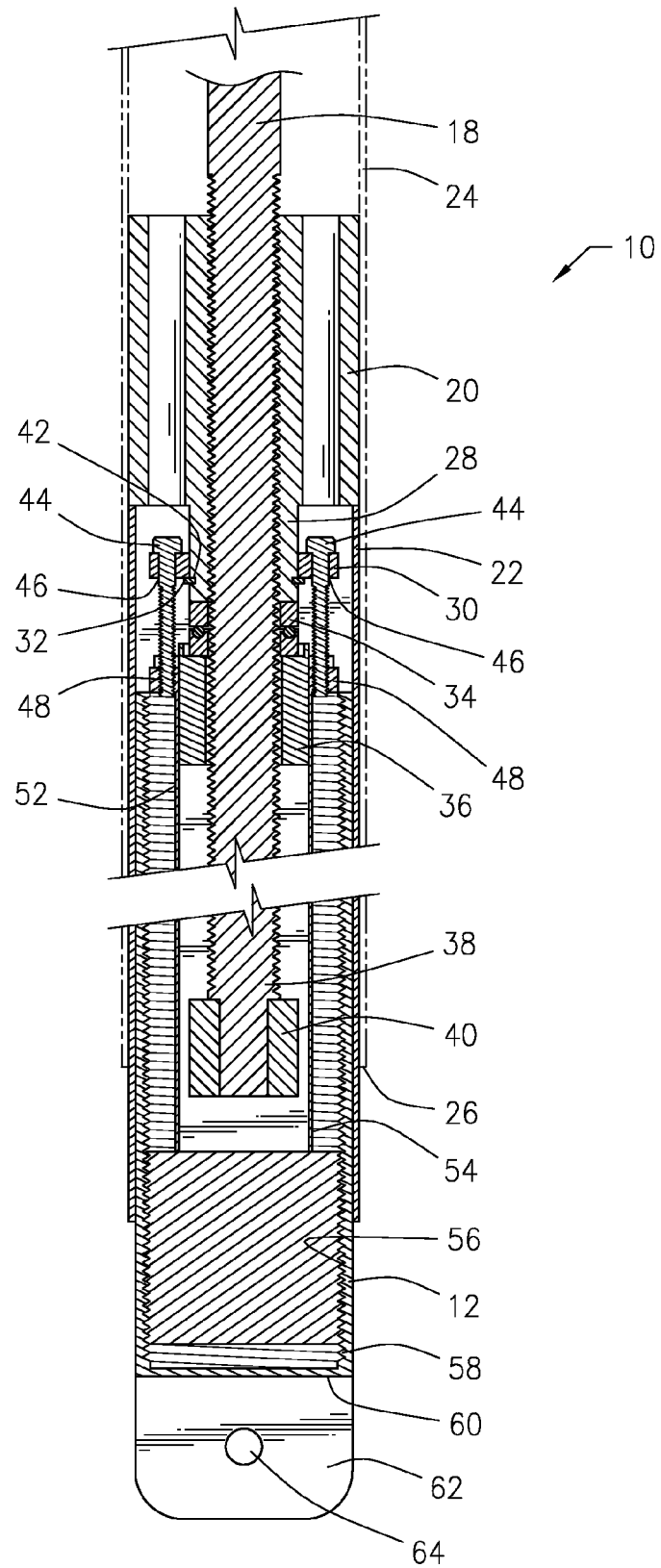
FIG. 6 is a cross section view taken along line 6-6 of FIG. 1 shown with the foot removed.

Referring also to FIGS. 3 and 6, the invention employs a reversible motor 16 that drives a vertical jack screw 18. The jack screw 18 engages a female threaded jack nut 20 which in turn extends or retracts an open ended inner tube 22 of the landing gear 10 depending on the direction of rotation of the jack screw 18. The extension of the inner tube 22 is illustrated in FIG. 5 by Arrow E. An outer tube 24 of the landing gear 10 covers the jack screw 18 and the jack nut 20, and the outer tube 24 is open on its bottom end 26 to allow the inner tube 22 and automatic extension tube 12 to telescope within the outer tube 24 and to telescope out the bottom end 26 of the outer tube 24, as will be more fully explained hereafter.

The jack screw 18 extends through a downwardly extending jack nut tube 28 provided on the jack nut 20, then through a bearing retainer 30, a snap ring 32, a bearing 34, and a bearing holder 36 before terminating on its lower end 38 in a drive nut 40. The snap ring 32 engages a circumferential groove 42 provided externally in the downwardly extending jack nut tube 28 of the jack nut 20 to secure the bearing retainer 30 to the jack nut 20. Bearing screws 44 extend through screw openings 46 provided in the bearing retainer 30 and around the bearing 34 and bearing holder 36 to secure to threaded openings 48 provided in a top 50 of a drive tube 52.

The drive nut 40 is encased within the drive tube 52 so that the drive nut 40 is free to move upward and downward within the drive tube 52, but so that the drive nut 40 rotates the drive tube 52 in conjunction with the turning of the jack screw 18. Thus, the drive tube 52 moves up and down in conjunction with the drive nut 40, but the bearing 34 also allows the drive tube 52 to rotate in conjunction with the jack screw 18.

A lower end 54 of the drive tube 52 is provided with male threads 56 that engage female threads 58 provided internally within the automatic extension tube 12 so that the male threads 56 of the lower end 54 of the drive tube 52 cause the automatic extension tube 12 to move upward or downward depending on the direction of rotation of the drive tube 52. The extension of the automatic extension tube 12 is illustrated in FIG. 5 by Arrow E'. A lower end 60 of the automatic extension tube 12 is provided with a bracket 62 with a pin opening 64 to which the foot 14 that is designed for engaging the ground attaches by means of a pin 66.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. An automated landing gear comprising:
   a reversible means for rotating functionally connected to a male threaded jack screw so that the motor rotates the jack screw,
   a jack nut with female threads engaging male threads on the jack screw to extend and retract an inner tube attached to the jack nut,
   a drive nut attached to a lower end of the jack screw so that the drive nut rotates with the jack screw,
   a drive tube encasing the drive nut so that the drive nut engages with and rotates the drive tube and the drive tube slides up and down around the drive nut, male threads provided on a lower end of the drive tube engaging female threads provided in an automatic extension tube to extend and retract the automatic extension tube in conjunction with the extension and retraction of the inner tube.

2. An automated landing gear according to claim 1 further comprising:
   a ground engaging foot attached to a lower end of the automatic extension tube.

3. An automated landing gear according to claim 1 further comprising:
   a bracket for attaching said outer tube to a piece of equipment.

4. An automated landing gear comprising:
   a reversible means for rotating functionally connected to a male threaded jack screw so that the motor rotates the jack screw,
   a jack nut with female threads engaging male threads on the jack screw to extend and retract an inner tube attached to the jack nut,
   a drive nut attached to a lower end of the jack screw so that the drive nut rotates with the jack screw,
   a drive tube encasing the drive nut so that the drive nut rotates the drive tube and the drive tube slides up and down around the drive nut, male threads provided on a lower end of the drive tube engaging female threads provided in an automatic extension tube to extend and retract the automatic extension tube in conjunction with the extension and retraction of the inner tube, and
   an outer tube attached to the reversible means for rotating, a lower end of the outer tube open to telescopically receive the inner tube.

5. An automated landing gear according to claim 4 further comprising:
   a lower end of the said inner tube being open to telescopically receive the automatic extension tube.

6. An automated landing gear comprising:
   a reversible means for rotating functionally connected to a male threaded jack screw so that the motor rotates the jack screw,
   a jack nut with female threads engaging male threads on the jack screw to extend and retract an inner tube attached to the jack nut,
   a drive nut attached to a lower end of the jack screw so that the drive nut rotates with the jack screw,
   a drive tube encasing the drive nut so that the drive nut rotates the drive tube and the drive tube slides up and down around the drive nut, male threads provided on a lower end of the drive tube engaging female threads provided in an automatic extension tube to extend and retract the automatic extension tube in conjunction with the extension and retraction of the inner tube, and
   a bearing surrounding the jack screw and connecting the rotating drive tube to the non-rotating jack nut.

7. An automated landing gear according to claim 6 further comprising:
   said jack screw extending through a downwardly extending jack nut tube provided on the jack nut, a bearing retainer secured to the jack nut tube, said bearing secured between the bearing retainer and a bearing holder, screws extending through screw opening in the bearing retainer and around the bearing and bearing holder to secure in threaded openings in the top of the drive tube as a means of securing the bearing to the rotating drive tube.

8. An automated landing gear according to claim 7 further comprising:
   a snap ring located between the bearing retainer and the bearing, said snap ring engaged in a circumferential groove provided externally on the downwardly extending jack nut tube as a means of securing the bearing to the non-rotating jack nut.

9. A method for fully extending and fully retracting an automatic extension tube that serves as a supporting leg for an attached foot without the need for manually lengthening and shortening the supporting leg comprising:
   operating a reversible means for rotating to rotate a jack screw which in turn engages a jack nut to extend and retract an inner tube that is telescopically received within an outer tube attached to equipment to be supported, allowing a drive nut that is attached to the jack screw and slidably received within a drive tube to engage with and rotate the drive tube which is attached to the jack nut via a bearing, and allowing male threads on the drive tube to engage female threads within an automated landing gear to raise and lower the automated landing gear and a ground engaging foot that is attached thereto.

* * * * *